United States Patent [19]

Kurakake

[11] 4,095,422
[45] Jun. 20, 1978

[54] VERTICAL-AXIS COMPOSITE SWINGING-BLADE WATER WHEEL

[75] Inventor: Yoshio Kurakake, Ohbu, Japan

[73] Assignee: Aquatech Co., Ltd., Ohbu, Japan

[21] Appl. No.: 786,961

[22] Filed: Apr. 12, 1977

[30] Foreign Application Priority Data

May 28, 1976 Japan .................................. 51-62023

[51] Int. Cl.² ........................ F16D 31/00; F03B 13/00
[52] U.S. Cl. ........................................ 60/398; 290/54; 417/334
[58] Field of Search .................... 60/325, 398, 501; 290/42, 43, 53, 54; 415/2, 5; 417/334

[56] References Cited

U.S. PATENT DOCUMENTS

| | | | |
|---|---|---|---|
| 958,467 | 5/1910 | Bennett | 60/325 X |
| 3,200,255 | 8/1965 | Masuda | 290/42 |
| 3,205,969 | 9/1965 | Clark | 60/398 X |
| 3,995,170 | 11/1976 | Graybill | 60/398 X |

FOREIGN PATENT DOCUMENTS

32,365   10/1975   Japan .................................. 60/398

Primary Examiner—Edgar W. Geoghegan
Attorney, Agent, or Firm—Flynn & Frishauf

[57] ABSTRACT

This invention relates to an improved vertical swinging-blade water wheel for converting a kinetic energy of a substantially horizontal stream into mechanical energy in which a pair or pairs of blade wheels are disposed symmetrically with respect to an output shaft, thereby forming a composite water wheel and the water wheel itself as a whole is prevented from rotating. Further, a plurality of blade wheels vertically arranged with the phases of the blades deviated through a predetermined angle may prevent interference of streams between the blades and equalize the fluctuations of the driving torques, thereby improving the efficiency and securing a relatively large power output by using a small-sized blade wheel with a small number of blades. Since the water wheel itself will not rotate as a whole, it may be used as a power source for light buoy generators floating in the water and underwater pumps.

5 Claims, 7 Drawing Figures

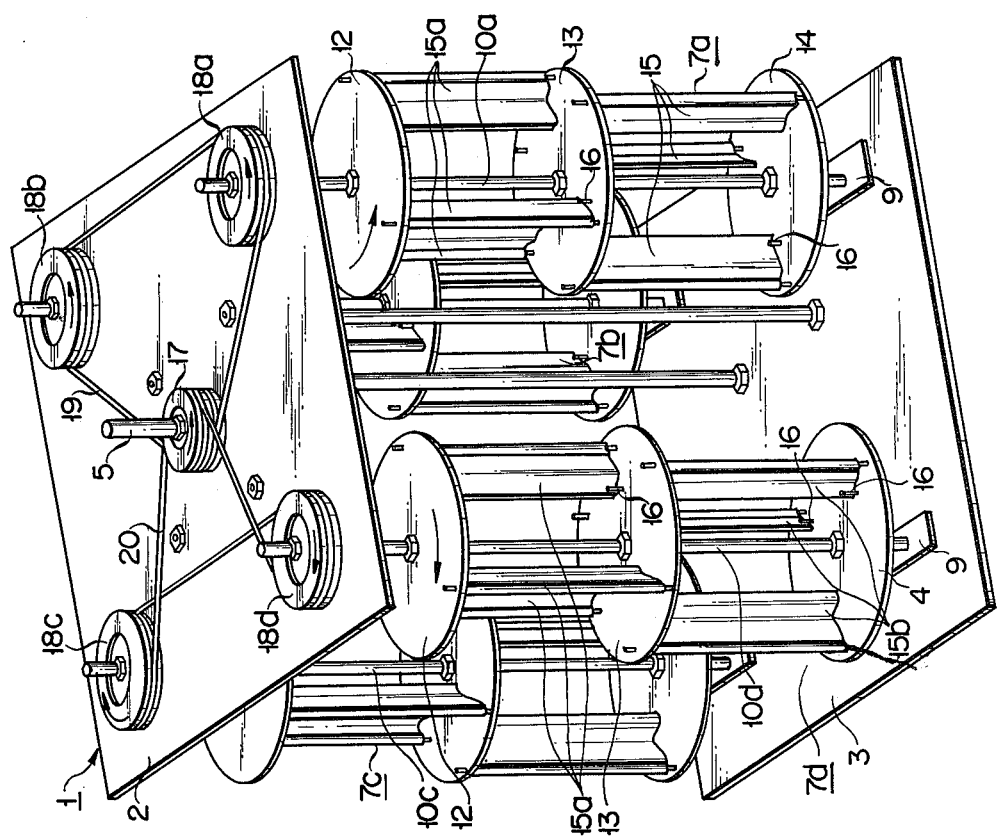
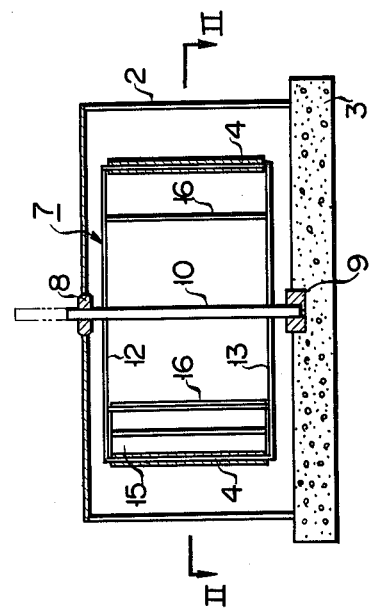
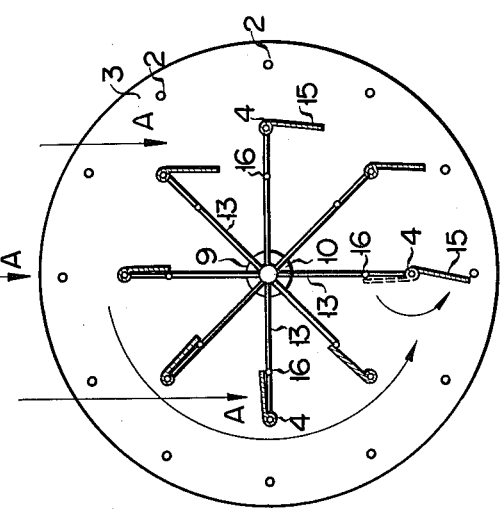

VERTICAL-AXIS COMPOSITE SWINGING-BLADE WATER WHEEL

BACKGROUND OF THE INVENTION

This invention relates to vertical swinging-blade water wheels capable of converting a kinetic energy of a substantially horizontal stream into mechanical rotational energy.

These types of vertical swinging-blade water wheels are well-known in the art. For example, an apparatus as illustrated in Japanese Patent Specification No. 32365/75 comprises a fixed circular horizontal base plate to act as a weight, a supporting frame attached to the top of the base plate, bearings disposed at the center of the top of the frame and the base plate center opposite thereto respectively, a vertical blade wheel shaft born by such bearings and extending upward through the upper bearing, upper and lower horizontal arms with the same length extending radially from the water wheel shaft at equiangular spaces within the supporting frame, auxiliary shafts connecting the outer ends of the upper and lower arms, swinging blades pivotably attached to the auxiliary shafts, and vertical stop pins disposed on the lower arms at positions away from the auxiliary shafts over a distance a little shorter than the blade width. When the swinging-blade water wheels are sunk at the bottom of a water flowing in the horizontal direction, the blades resting on the pins are thrusted by the stream in the flowing direction. The blades located in positions symmetrical to such blades with respect to the water wheel shaft are not subject to the stream pressure as they are in free positions away from the stop pins. Thus, the vertical water wheel shaft is rotated around the axis by the blades subject to such stream pressure, thereby supplying mechanical power output to an optional apparatus via the upper end of the shaft.

However, such type of swinging-blade water wheel suffered from a major defect that it requires either larger area of blade or greater number of blades in order to obtain an intensive power output efficiently from a relatively slow stream. The former requirement will result in too expensive initial cost, while the later will bring about interference among the blades, causing decreased efficiency. Further, such apparatus also has a defect that the water wheel as a whole rotates about itself, thereby entangling the mooring cable, so that it may not be used in a floating state.

SUMMARY OF THE INVENTION

In order to solve the aforementioned problems, the apparatus according to the present invention is provided with a pair or pairs of swinging-blade water wheels arranged symmetrically with respect to an output shaft of the apparatus so as to rotate in opposite directions, further comprising a plurality of blade wheels arranged vertically on water wheel shafts so that each two adjacent blade wheels deviate from each other through a predetermined angle, each of such blade wheels having a small number of small blades arranged around each water wheel shaft, and a gearing which transmits the rotations of the respective vertical swinging-blade water wheels to the output shaft, thereby changing the directions of such rotations into one direction. Thus, there will be obtained a water wheel which can be operated in a floating state without rotating as a whole and which will yield a large power output efficiently with small-sized blades arranged around the water wheel shaft even in a slow stream.

Therefore, a primary object of this invention is to provide a composite swinging-blade water wheel apparatus capable of yielding a large power output in a slow stream and operating in a floating state without rotating itself as a whole.

Another object of this invention is to provide a composite water wheel capable of supplying an electric power to a light buoy floating on the water surface in cooperation with a generator.

An additional object of this invention is to provide a composite water wheel floating near and under the surface of the water capable of operating a pump which has an inlet connected with a water conduit at the upper end thereof and an intake lying at the bottom of the water for pumping up the water from the bottom to the surface.

These and other objects, together with the advantages thereof over the prior art apparatus, will become apparent from the following description and the accompanying drawings which are provided for the purpose of illustration only.

BRIEF DESCRIPTION OF THE DRAWINGS

FIG. 1 is a schematic front elevational view of a known single vertical swinging-blade water mill;

FIG. 2 is a plan view of the water mill illustrated in FIG. 1;

FIG. 3 is a schematic perspective view of the verticalaxis composite swinging-blade water wheel according to the present invention;

DETAILED DESCRIPTION OF THE PREFERRED EMBODIMENT

Figure 5:
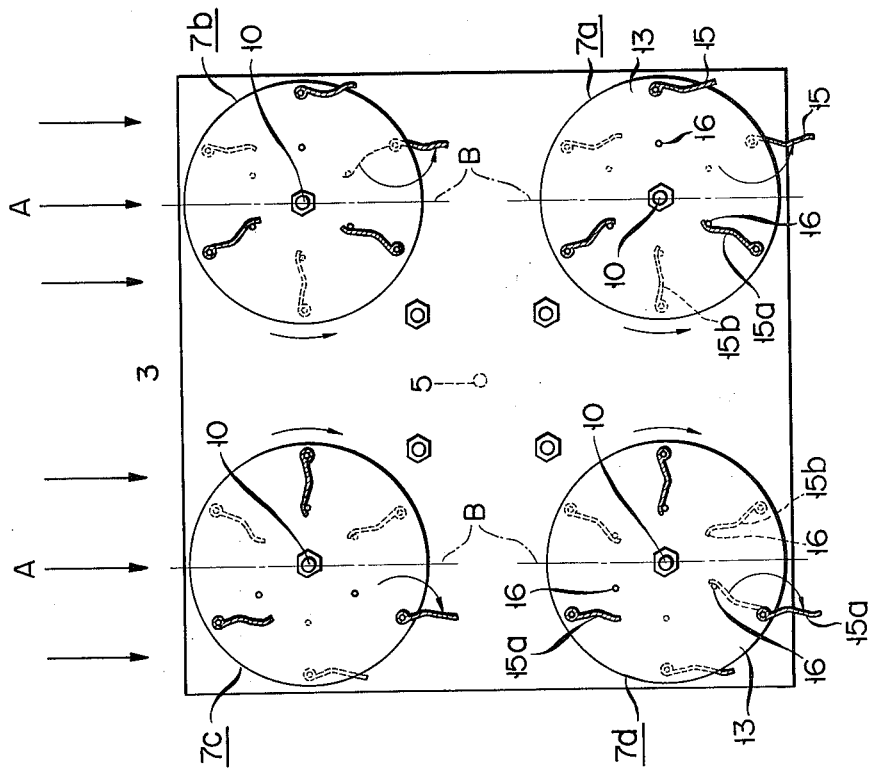
FIG. 5 is a cross-sectional plan view as taken on line V—V of FIG. 4 showing the action of the swinging blades.

First referring to FIGS. 1 and 2, I will now describe the vertical swinging-blade water wheel as disclosed in Japanese Patent Specification No. 32365/75. This apparatus is composed of a discoide concrete base plate 3, a support frame 2 assembled into a cylindrical form of suitable height on the base plate 3, and two bearing members 8 and 9 attached to the center of the upper frame and the opposite center on the upper surface of the base plate 3 respectively. A vertical water wheel shaft 10 is rotatably journaled on these bearings 8 and 9 at the upper and lower ends of the shaft 10. In use, the plate 3 is horizontally settled in water so that the vertical shaft 10 crosses the streamlines at right angles. In the support frame 2, a supporting member 7 attached to the water wheel shaft 10 comprises eight pairs of upper and lower arms 12 and 13 disposed horizontally in parallel with each corresponding arm and extending radially at equiangular spaces with respect to the axis of the water wheel shaft 10, auxiliary shafts 4 being provided between the ends of the respective upper and lower arms. A blade 15 is pivotally attached to each auxiliary shaft 4. A vertical stop pin 16 is sandwiched between each pair of arms at positions away from the ends of the respective arms over a distance a little shorter than the width of the blade. Thus, the blade 15, when rotated around the auxiliary shaft 4, hits against the stop pin 16 to be prevented from rotating further. The blade 15 will be called a swinging blade hereinafter.

Now I will describe the function of this well-known apparatus. First the apparatus is put under water and the base plate 3 is fixed to the bottom of the water. In FIG. 2 the arrow A designates a substantially horizontal stream flow. Also in FIG. 2, the blades 15 on the left side of the diameter of the base plate 3 parallel to the streamlines are all subject to the stream pressure as they are rested one the pins 16, while the blades 15 on the right side of said diameter are hardly subject to such stream pressure because they are headed toward the direction parallel to the stream flow, disengaged from the stop pins 16. Accordingly, a blade wheel 7 composed of said upper and lower arms 12 and 13, auxiliary shafts 4, blades 15, and shaft 10 is applied with an intensive torque by the stream on the left side of said diameter, while the blade wheel 7 is applied with only a small opposite torque by the resistance of the blades against the stream on the right side of said diameter, the blade wheel thereby being caused to rotate counterclockwise around the blade wheel shaft 10 as viewed from above in FIG. 2. Thus, the apparatus may efficiently convert the kinetic energy of the stream into a mechanical rotational energy. Such apparatus will be called the vertical swinging-blade water wheel hereinafter.

Figure 4:
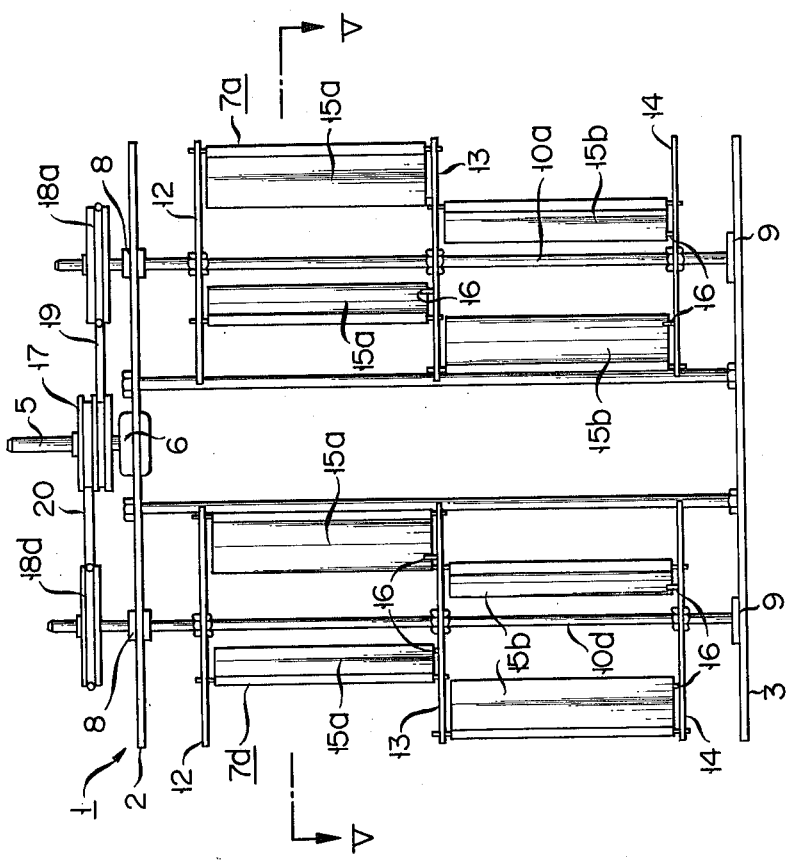
FIG. 4 is a front elevational view of the composite water wheel of FIG. 3.

Referring now to FIGS. 3, 4 and 5, there is illustrated the apparatus according to the present invention which is a vertical axis composite swinging-blade water wheel generally designated by numeral 1. This apparatus comprises a frame composed of horizontal and parallel upper and lower retaining plates 2 and 3 fixed at a predetermined spacing by means of four connecting bolts, an output shaft 5 vertically born by a bearing member at the center of the upper retaining plate 2, two pairs of vertical swinging-blade water wheels 7a, 7c, 7b and 7d disposed symmetrically with respect to the output shaft 5 between the two retaining plates 2 and 3 so as to rotate in opposite directions, each of these water wheels including a water wheel shaft 10 vertically born by the upper and lower retaining plates 2 and 3 through the bearing members 8 and 9 and having its upper end extending upward through the upper retaining plate, shroud discs 12, 13 and 14 fixed to the water wheel shaft horizontally and coaxially therewith at a predetermined vertical spacing, a small number of or, e.g., three vertical swinging blades 15 disposed in each of two spaces between the shroud discs 12 and 13 and between the shroud discs 13 and 14 at equiangular spacings along the circumference of a circle with the axis of the water wheel shaft as the center and pivotably mounted on the shroud discs, the pivotal points of these blades between the discs 12 and 13 deviating in phase from the pivotal points between the discs 13 and 14 through an angle of 60°, and vertical stop pins arranged at positions away from the pivotal points over a distance a little shorter than the width of the blade along the radii extending between the pivotal points and the axis of the shaft 10; and a gearing means as mentioned below for transmitting the torque from the water wheels 7a, 7b, 7c and 7d to the output shaft 5.

In the water wheel 7, there are arranged a small number of or, e.g., three small blades 15a at good spacings for avoiding interference of streams between the blades around the upper water wheel shaft. However, such small blades secure too small an area to receive the stream flow, so that there are further arranged blades 15b of the same size under such blades 15a so that the lower blades 15b deviate in phase from the upper blades 15a through an angle of 60°, thereby doubling the torque applied on the water wheel shaft 10 and equalizing the torque fluctuation.

Further, the water wheels 7a and 7c as well as 7b and 7d are so set as to rotate in directions opposite to each other, thereby preventing the apparatus as a whole from rotating about the output shaft 5.

The torque transmitting gearing means is composed of a double-grooved pulley 17 mounted on the output shaft, pulleys 18 mounted on the upper ends of the respective water wheel shafts 10 of the water wheels 7a, 7c, 7b and 7d, an open belt 19 put on two pulleys 18a and 18b rotating in the normal direction and the lower groove on the double-grooved pulley 17, and a crossed belt 20 is put on the reversely rotating two pulleys 18c and 18d and the upper groove on the double-grooved pulley 17, and so designed as to transmit the rotations of the water wheel shafts 10a, 10b and 10c, 10d, to the output shaft 5, the shafts 10a and 10b being rotatable in the reverse direction with the reverse rotations thereof being converted at the output shaft into the normal direction rotation.

Now I will describe the operation of the composite vertical swinging-blade water wheel of the invention. When the whole of the apparatus is set e.g. near and under the surface of the sea with the frame of the apparatus maintained by a suitable means such as a float, the respective blades 15 of the water wheels 7a, 7b, 7c and 7d take such positions as shown in FIG. 5. That is, with the center line B along the direction of the stream flow A passing through the water wheel shafts 10 as a border, the blades 15 on the output shaft 5 side are engaged with the stop pins 16 to be subject to the stream pressure, while the blades 15 on the other side of the border line B are disengaged from the stop pins 16 to be rendered parallel to the direction of the stream, thereby being freed from any substantial stream pressure. Accordingly, there may be caused a substantial torque difference between the both-side blades. Such torque difference rotates the water wheel shafts 10 via the shroud discs 12, 13 and 14. The torques of the four water wheel shafts are added up and transmittted to the output shaft 5 by the torque transmitting gear means, thereby rotating such output shaft 5. Being the sum total of the torques of all the water wheels, the torque on the output shaft may be large enough to be utilized as a power source for suitable services.

Figure 6:
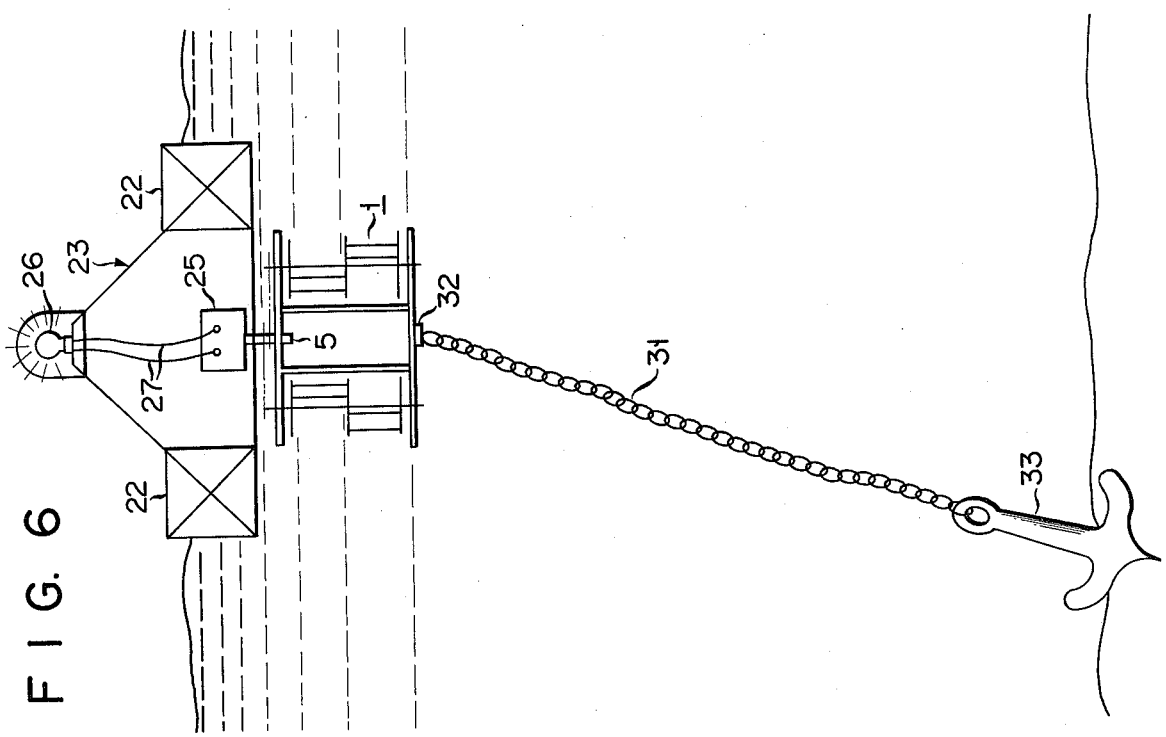
FIG. 6 is a schematic front view of the apparatus according to this invention used with a floating light buoy.

FIG. 6 illustrates another embodiment of the verticalaxis composite swinging-blade water wheel according to the invention. A conical buoy provided with a float 22, crowned with an electric lamp 26 connected to an electric generator 25 located at the inner bottom of the buoy by conducting wires 27, is coupled to the vertical-axis composite swinging-blade water wheel 1 via its output shaft 5 and an input shaft of the electric generator. This apparatus is moored to the bottom of the water by an anchor 33 connected securely to the center of the bottom of the composite water wheel by means of an anchor chain 31, thus keeping the upper half of the buoy emerging out of the water surface. The water flow rotates the water wheels and hence the output shaft of the composite water wheel. The composite water wheel itself is kept non-rotatable as a whole while the generator shaft is rotated to yield electric power, an electric current flows through the conducting wires, and the lamp is lighted up. The advantages of the above-mentioned apparatus lie in that (1) the necessity of replacing an electric battery is eliminated and maintenance costs are reduced remarkably, (2) the apparatus may be used semipermanently, and (3) the apparatus may be effectual even when the direction of the substantially horizontal water flow is varied. Naturally, such apparatus may be further provided with a photosensitive switch and a charging battery so that the battery charges the generator while in the light and the lamp may be lighted up only in the dark.

Figure 7:
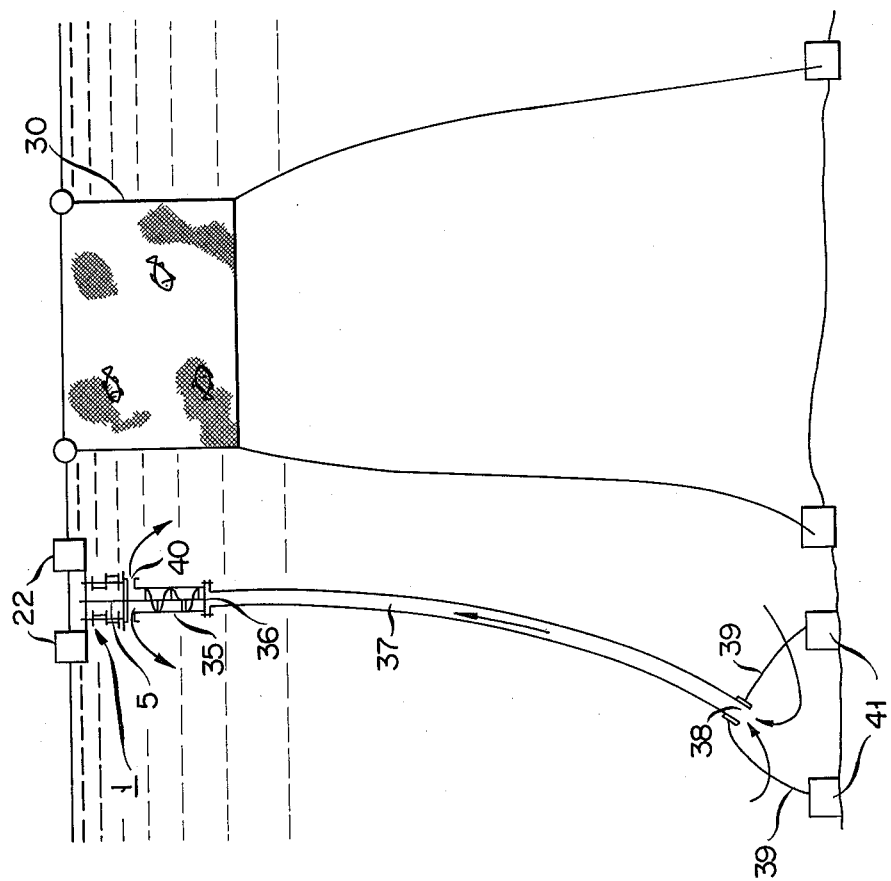
FIG. 7 is a schematic front view of the apparatus according to this invention used with a pumping system afloat in the water.

Another embodiment of the invention is shown in FIG. 7. In this vertical-axis composite swinging-blade water wheel according to the invention crowned with the float 22, a shaft of an Archimedean screw pump 35 is connected to the lower end of the output shaft 5, an outlet end of a water conduit pipe 37 is connected to a lower inlet 36 of the pump 35, and a water intake end 38 of the water conduit pipe 37 is open in the vicinity of the sea bottom. The apparatus is moored at the water intake end 38 by weights 41 placed on the sea bottom through ropes 39 and kept afloat, by means of a float 22, on the surface of the water near a nursery 30 for raising marine products (fish, shellfish, shrimp, lobster, laver, etc.). The output shaft 5 of the composite swinging-blade water wheel yields a torque through a horizontal flow of a stream (e.g., tidal current, gulf stream, etc.) to actuate the pump 35, thereby pumping up the water at the bottom of the sea and discharging it through a pump outlet 40 near the surface of the sea. Thus the water temperature and fertility of the nursery may be improves.

What is claimed is:

1. An apparatus to convert a kinetic energy of a substantially horizontal stream into a torque, comprising:
    (a) two parallel horizontal retaining plates, said plates being fixed at a predetermined vertical distance from one another by means of a plurality of spacer bolts, thereby forming a frame;
    (b) a vertical output shaft at the center of said frame;
    (c) at least a pair of vertical-axis swinging-blade water wheels disposed symmetrically with respect to the axis of the output shaft, each of said water wheels further comprising a vertical water wheel shaft mounted between said retaining plates, shroud discs attached to said water wheel shaft coaxially therewith at a predetermined vertical distance from one another and capable of rotating in a body with said water wheel shaft, a plurality of vertical swinging blades pivotably attached to and between said shroud discs at points equiangularly spaced along the circumference of circles of the shroud discs with the axis of said water wheel shaft as the center, and vertical stop pins arranged on each shroud disc at positions away from said pivotal points over a distance a little shorter than the width of the blade along the radii extending between said respective pivotal points and the axis of the water wheel shaft; and (d) means for converting the rotations of the respective water wheel shafts into a rotation in one direction and transmitting the resultant torque to said output shaft.

2. An apparatus recited in claim 1 wherein each of said water wheels has a plurality of upper and lower blade wheels, the phases of the blades of the respective wheels deviating successively by predetermined angles.

3. An apparatus recited in claim 1 wherein said torque transmitting means comprises a double-grooved pulley mounted on said output shaft, pulleys mounted on the respective water wheel shafts, an open belt passing through one groove on said double pulley to connect the pulleys which rotate in the same direction with said output shaft, and a crossed belt passing through the other groove on said double pulley to connect the pulleys which rotate in the opposite direction to said output shaft.

4. An apparatus recited in claim 1, further comprising:
    (a) a control buoy provided with a float;
    (b) a lamp situated at the top of said buoy;
    (c) an electric generator coupled to said output shaft of the composite swinging-blade water wheel;
    (d) conducting wires to connect said lamp and said generator; and
    (e) a mooring means for fixing said floating apparatus to the bottom of a body of water.

5. An apparatus recited in claim 1, further comprising:
    (a) a float attached to the top of said composite swinging-blade water wheel;
    (b) a pump having a discharge outlet located directly below said composite swinging-blade water wheel and a pump shaft coupled to said output shaft of said composite water wheel;
    (c) a water conduit pipe connected to the inlet of said pump, the intake of said conduit pipe being situated near the bottom of a body of water and near at least one weight; and
    (d) cables for mooring said pipe to said at least one weight, said at least one weight being sunk at the bottom of the body of water.

* * * * *